Figure 1:
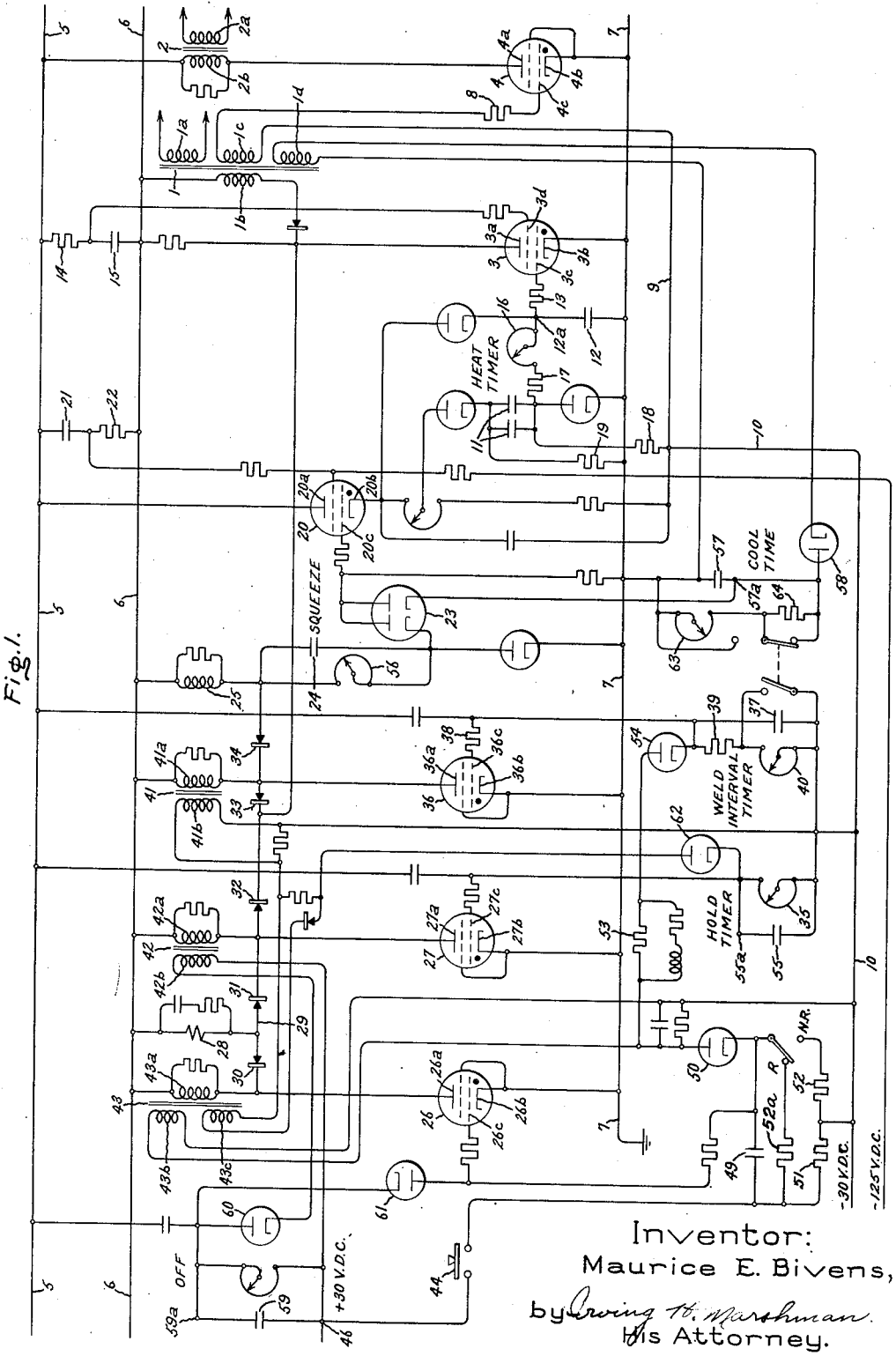

Sept. 25, 1956 M. E. BIVENS 2,764,700
SEQUENCING CONTROL SYSTEMS
Filed June 14, 1954 2 Sheets-Sheet 1

Inventor:
Maurice E. Bivens,
by Irving H. Marshman.
His Attorney.

Sept. 25, 1956　　　　　M. E. BIVENS　　　　　2,764,700
SEQUENCING CONTROL SYSTEMS
Filed June 14, 1954　　　　　　　　　　　　　　　2 Sheets-Sheet 2
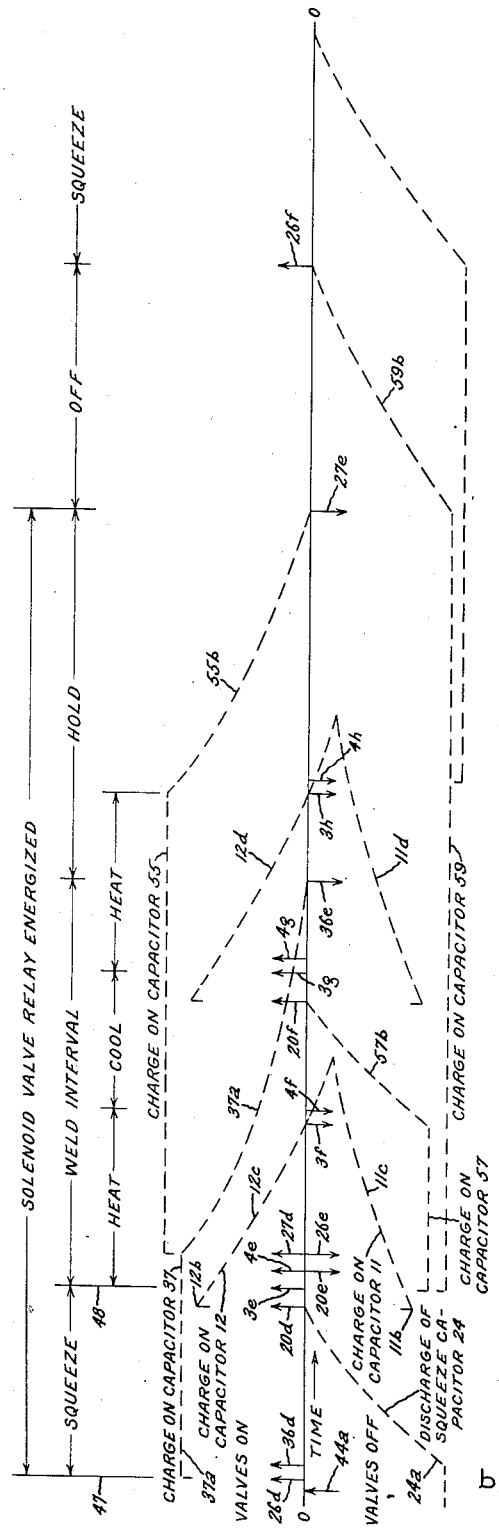
Inventor:
Maurice E. Bivens,
by Irving H. Marshman.
His Attorney.

United States Patent Office 2,764,700
Patented Sept. 25, 1956

2,764,700

SEQUENCING CONTROL SYSTEMS

Maurice E. Bivens, Schenectady, N. Y., assignor to General Electric Company, a corporation of New York Application June 14, 1954, Serial No. 436,671

7 Claims. (Cl. 307—112)

This invention relates to control systems, more particularly to control systems in which a number of operations are to be carried out in a predetermined sequence, and it has for an object the provision of a simple, reliable and improved control system of this character.

More specifically, the invention relates to electronic control systems in which a plurality of load circuits or load devices are to be energized in a predetermined sequence by means of a plurality of electric valves, which are energized in a predetermined sequence, and an object of the invention is to reduce to a minimum the number of electric valves that are required in the control system to effect such sequence energization of the load devices.

For example, in resistance welding control systems, a number of load circuits or devices may require energization in a predetermined sequence in order to effect the welding cycle of (1) moving the welding electrodes to the "squeeze" position in forced contact with the workpiece, (2) providing a welding interval which is divided into a number of alternate "heat" and "cool" periods, (3) a "hold" period in which the electrode pressure is maintained to hold the workpiece after termination of the welding current until a homogeneous weld is formed, and (4) an "off" time following completion of the weld and separation of the electrodes before the electrodes can again be moved into work engagement position.

This sequence of steps in the resistance welding process has been carried out in the past by means of a plurality of electric valves which were energized in a predetermined sequence to energize in sequence such load circuits as the solenoid valve which controls the movement of the electrodes, and a plurality of control transformers which furnish charging voltages to timing circuit capacitors, and signal voltages to the control electrodes of electric valves to initiate control operations.

A specific object of this invention is to reduce to a minimum the number of valves required by means of improved circuits which transfer the control of the energization of the load devices from one electric valve to another during the sequence operations. In carrying the invention into effect in one form thereof, a plurality of electric valves are provided for controlling the sequential energization of a plurality of load devices from a pair of voltage supply terminals. The number of load devices to be controlled may be, and usually is, larger than the number of valves. Each of the valves is provided with an input control circuit and an output circuit, of which one terminal is connected to one of the voltage supply terminals and the other terminal is connected to a corresponding section of a conductor which is divided into sections by a number of rectifiers. One terminal of each of the load devices is connected to the other voltage supply terminal, and its own other terminal is connected to a corresponding section of the sectionalized conductor. Means are provided for energizing the input circuits of the electric valves in a predetermined sequence, thereby to energize their output circuits. A plurality of rectifiers are connected in the sectionalized conductor, at least one rectifier in each section thereof. They are poled to provide for energization of certain of the load devices by more than one of the electric valves during their sequential operation, and to effect energization of all of the load devices in predetermined groupings and in a predetermined sequence, in response to energization of the input circuits of the electric valves.

For a better and more complete understanding of the invention, reference should now be had to the following specification and to the accompanying drawings, of which Fig. 1 is a simple, schematic, diagrammatical illustration of a resistance spot welding control system, which is illustrative of an embodiment of the invention, and Fig. 2 is a chart of characteristic curves and legends which facilitates an understanding of the operation of the control system.

Referring now to Fig. 1 of the drawing, which is a schematic diagram of a resistance spot welding control system, the two windings 1a and 2a may be considered to be the secondary windings of two control transformers 1 and 2, respectively, which are utilized to supply the timed voltage impulses to the firing circuit of a pair of ignitron electric valves (not shown) which, through a welding transformer (also not shown), supply welding current to the welding electrodes. The primary windings 1b and 2b of these transformers are connected in the anode circuits of two timing electric valves 3 and 4, respectively, which are preferably thyratron valves. These valves are respectively provided with anodes 3a and 4a, cathodes 3b and 4b, and control electrodes 3c and 4c, and they are interconnected to provide for trailing operation of valve 4 with respect to valve 3, i. e., the valve 3 will fire during the positive half-cycle of the alternating supply voltage, and the valve 4 will fire during the next succeeding or negative half-cycle. Alternating voltages which are displaced from each other 180 degrees are supplied to the anodes 3a and 4a from alternating voltage supply conductors 5 and 6, which may be considered to be the secondary terminals of a supply transformer which is not shown. To the grounded conductor 7 which may be considered to be the center tap of such secondary winding, the cathodes 3b and 4b are connected. The main control electrode 4c of trailing timing valve 4 is connected through resistor 8, secondary winding 1c of transformer 1, and conductor 9 to a direct voltage supply terminal 10 which may be considered to have a voltage which is negative with respect to ground by a predetermined amount such, for example, as 30 volts. Thus, valve 4 is maintained normally nonconducting by the negative voltage which is supplied to its control electrode. However, when leading timing valve 3 conducts, the transformer 1 is energized and a turn-on voltage is induced in the secondary winding 1c which overcomes the negative bias and renders valve 4 conducting. Thus, when valve 3 becomes conducting during the positive half-cycle of its anode voltage, which is assumed to be the positive half-cycle of the supply voltage, the timing valve 4 becomes conducting during the next or negative half-cycle of the supply voltage, when positive voltage is supplied to its own anode 4a. Consequently, valve 4 will always operate in trailing response to valve 3 and is therefore referred to as the trailing timing valve.

For controlling the period of conduction of valve 3, a double-capacitor timing circuit is provided which comprises the two capacitors 11 and 12. In order to indicate that capacitor 11 has a greater capacity than capacitor 12, it is illustrated as two capacitors. Since this double capacitor timing circuit controls the time during which the timing valves 3 and 4 conduct, it also times the period during which the main ignitron valves (not shown) supply welding current to the welding transformer. It is therefore referred to as the weld "heat" timer, or simply the "heat" timer. The capacitor 12 is connected across the cathode 3b and control electrode 3c of leading timing valve 3 through current limiting resistor 13. A second control electrode 3d of leading timing valve 3 is connected to the common terminal of a resistor 14 and a capacitor 15, which are connected in series relationship across the supply conductors 5 and 6 to provide a static phase shift circuit. This phase shift circuit is adjusted to provide an alternating voltage on the auxiliary control electrode 3d which permits valve 3 to become conducting only during the early part of the positive half-cycle of its anode voltage, i. e., the first 30 degrees.

With the supply conductors 5 and 6 energized, timing capacitors 11 and 12 are charged by the voltage across the conductors 7 and 10. The charging circuit for the capacitor 12 is traced from conductor 7 through adjustable timing resistor 16, fixed resistors 17 and 18, to the terminal 10, and as a result capacitor 12 is charged positive at its lower terminal and negative at its terminal 12a, to which the control electrode 3c is connected. These timing capacitors 11 and 12 are connected in a local discharge timing circuit with adjustable resistor 16 and fixed resistors 17 and 19. Resistor 16 is very much larger than resistors 17 and 19, and consequently, its adjustment is dominant in determining the time constant of the timing circuit. During standby, the capacitors 11 and 12 are charged, so that their voltages will oppose each other in the local timing circuit, with the negative terminal of capacitor 12 connected to control electrode 3c to maintain timing valve 3 inactive.

Action of the heat timer is started by an initiating valve 20, which is preferably a thyratron provided with an anode 20a, a cathode 20b, a main control electrode 20c, and an auxiliary control electrode. The auxiliary control electrode is connected to an intermediate point of a static phase shift circuit which comprises capacitor 21 and a resistor 22 connected in series relationship with each other across supply conductors 5 and 6. The phase of the voltage which is supplied to the auxiliary control electrode is such that the valve 20 can begin conducting only in the early portion of the positive half-cycle of its anode voltage, and subject of course to the control imposed by the main control electrode 20c.

In order normally to maintain valve 20 nonconducting, it is biased below cutoff by means of a connection which is traced from grounded conductor 7 through diode valve 23, a capacitor 24, which controls the "squeeze" time, and reactor 25 to supply conductor 6. The anode of valve 20 is connected to supply conductor 5. Consequently, when the anode voltage is positive, the voltage supplied from supply conductor 6 to the control electrode 20c is negative. The squeeze time capacitor 24 which was charged in the previous half-cycle adds a negative bias voltage to insure maintaining valve 20 below cutoff.

An electric valve 26 is instrumental in initiating the entire welding operation sequence, and is consequently referred to as the sequence initiating valve. It is preferably a thyratron and has its anode 26a connected through the primary winding of a control transformer to the supply conductor 5, and its cathode 26b connected to grounded conductor 7. It is provided with a main control electrode 26c which is normally connected to terminal 10 of the control voltage source, which is 30 volts negative with respect to ground, so that it is normally biased below cutoff.

Another valve 27, which is preferably a thyratron, is provided to exercise certain control over the solenoid valve which controls the admission of pressure fluid to a cylinder, which acts to squeeze the welding electrodes together. The actuating solenoid 28 of this solenoid valve is connected between supply conductor 6 and a section of a conductor 29 which is sectionalized by means of a plurality of surface contact dry-type rectifiers 30, 31, 32, 33 and 34. The valve 27 is provided with an anode 27a, a cathode 27b, and a control electrode 27c. The anode 27a is connected to the section of the sectionalized conductor to which the valve operating solenoid 28 is connected, and the cathode 27b is connected to the grounded conductor 7. Normally, the valve 27 is biased below cutoff by means of a connection of its control electrode through adjustable resistor 35 to the terminal 10, of which the voltage is 30 volts negative with respect to ground.

An electric valve 36, which is preferably a thyratron, cooperates with a capacitor 37 to time the weld interval which is the overall time allowed for the periodic applications of welding current and intervening cool time periods, and thus to control the number of separately timed applications of welding current to a single spot. Its cathode 36b is connected to the grounded conductor 7, and its anode 36a is connected to the section of sectionalized conductor 29, which is situated between rectifiers 33 and 34. Its control electrode 36c is connected through resistors 38, 39 and 40 to supply voltage terminal 10, of which the voltage is negative with respect to ground, and thus valve 36 is normally biased below cutoff.

Paralleling connections are provided between the resistor 40 and the weld interval timing capacitor 37, so that the resistor is part of the timing circuit. It is made adjustable to provide for adjusting the weld interval time. The primary winding 41a of a control transformer 41 is connected between the alternating voltage supply conductor 6 and the section of the sectionalized conductor to which the anode of valve 36 is connected.

It will be noted that the anodes of electric valves 26, 27 and 36 are connected to the alternating voltage supply conductor 6, and that the anodes of electric valves 4 and 20 are connected to the supply conductor 5. Consequently, the voltages supplied to the anodes of valves 4 and 20 are 180 degrees out of phase with respect to the voltages supplied to the anodes of valves 26, 27 and 36.

In the standby condition prior to initiation of the sequencing control, all of the electric valves 3, 4, 20, 26, 27 and 36 are biased below cutoff and are therefore nonconducting, as explained in the foregoing. Consequently, the firing circuit transformers 1 and 2, and control transformers 41, 42 and 43, of which the primary winding of each is connected in the anode circuit of one or more of these valves, are deenergized and no welding current is being supplied from the welding transformer to the work. The condition of nonconduction of valves 3, 4, 20, 26, 27 and 36 is represented in the curve chart of Fig. 2 by the area beneath the horizontal O—O axis.

One of the main functions of a control of the character thus far described is to sequence a number of operations of a machine, used in the performance of some industrial operation or process. For the purpose of illustration and explanation, it has been assumed that the control was being used to control in sequence the several steps in the operation of a resistance welding machine. It will be clear, however, that the control would be useful in controlling and sequencing steps in the operation of other types of machines or processes. The operation of the control will now be described as applied to sequencing steps in the operation of a resistance welding machine.

One of the specific functions of the control in its application to a welding machine is to sequence the energization of transformers 1 and 2 with respect to which it has been assumed that their secondary windings are connected in the firing circuits of the main ignitron valves, which supply welding current to the primary of the welding transformer, of which the secondary winding is connected to the welding electrodes.

The sequence of operation is initiated by closing the initiating switch 44. This instant in time is represented by the position of the arrow 44a on the O—O axis. As a result the control electrode 26c of sequence initiating valve 26 is connected to supply voltage terminal 46, of which the voltage is positive with respect to ground by a substantial amount, e. g., 30 volts. Valve 26 becomes conducting, and the operating coil 28 of the solenoid valve is energized. Its circuit is traced from supply line 6 through solenoid 28, rectifier 30, and anode-cathode conducting path of valve 26 to ground. This operation is indicated by the arrow 26d in Fig. 2, and the instant in time is represented by the position of the arrow on the O—O axis. Energization of the solenoid valve results in the admission of pressure fluid to an operating cylinder (not shown) which causes the welding electrodes to be moved into forcible engagement with the pieces to be welded. After the initiating switch 44 has been closed, the application of welding current must be delayed until the electrodes have been forced into contact with the work. This delay is known as the "squeeze" time, and is represented in Fig. 2 as the interval between vertical lines 47 and 48.

Simultaneously with the energization of the solenoid valve, the transformer 43 is energized, since its primary winding 43a also is connected in the anode-cathode conducting path of valve 26.

The voltage which is induced in its secondary winding 43b charges the capacitor 49 positive at its terminal which is connected to control electrode 26c of the initiating valve. The charging circuit extends from one terminal of the secondary winding 43b through diode valve 50, capacitor 49, resistor 51, to the opposite terminal of the secondary winding. The resulting voltage drop across resistors 51 and 52a, or if the R-N. R. switch is in the R position the voltage drop across a resistor 52 which is connected in parallel with capacitor 49 and resistor 51 maintains the control electrode 26c positive. Consequently, the initiating switch 44 may be released, and the sequence continues automatically. Optionally, the initiating switch 44 may be maintained closed for the purpose of initiating a second sequence of operations immediately after the first one terminates. At the same time, the weld interval timing capacitor 37 is charged. Its charging circuit is traced from one terminal of secondary winding 43b through resistor 53, diode electric valve 54, capacitor 37, to the opposite terminal of the secondary winding. The charging of capacitor 37 is represented in Fig. 2 by the broken line 37a.

An additional secondary winding 43c of transformer 43 applies a turn-off voltage in the circuit of a "hold" timing capacitor 55, which will prevent transformer 41 from charging the capacitor when the electric valve 36 subsequently becomes conducting and energizes the transformer 41 to supply a turn-on voltage. The hold time is the interval following the termination of welding current, during which the electrodes are maintained in forced contact with the work. The secondary windings 41b and 43c are oppositely poled and consequently, as long as electric valve 26 is conducting, the hold timing capacitor 55 cannot be charged.

As a result of the charging of the weld interval timing capacitor 37, electric valve 36 becomes conducting, since its control electrode 36c is connected to the positive terminal of the capacitor. The firing of valve 36 is represented in Fig. 2 by the arrow 36d and the instant in time is represented by the position of the arrow on the O—O axis.

Conduction by valve 36, for all practical purposes, results in connecting the positive terminal of the squeeze capacitor 24 to the grounded conductor 7, thereby to remove the charging voltage and to initiate discharge of the capacitor through the adjustable squeeze time resistor 56, which discharge is represented in Fig. 2 by the portion of curve 24a between the horizontal portion and the O—O axis. At the end of the discharge period, which is determined by the adjustment of resistor 56, the voltage of the control electrode 20c of the initiating valve 20 becomes sufficiently positive to cause the valve 20 to conduct. The instant of the beginning of conduction of valve 20 is represented in Fig. 2 by the arrow 20d. As a result of this conduction by valve 20, the heat timing capacitor 11 is charged positive at its terminal 11b and the other heat timing capacitor 12 of the double capacitor timer is charged positive at its terminal 12a. These charges are illustrated in Fig. 2 by the points 11b and 12b of curves 11C and 12C, respectively.

The positive voltage at terminal 12a is applied to the control electrode 3c of the leading heat timing valve 3 which becomes conducting and energizes the primary winding 1b of control transformer 1. Conduction by valve 3 is indicated by the arrow 3e in Fig. 2. The firing of valve 3 marks the end of the squeeze time and the beginning of the first heat period of the weld interval. The voltage which is induced in the secondary winding 1d charges the cool time capacitor 57 through diode valve 58, which is poled so that the charge on the capacitor is negative at terminal 57a as represented in Fig. 2 by the curve 57b. This results in terminating conduction in valve 20 at the end of its first half-cycle of conduction, since its control electrode 20c is connected through double diode valve 23 to the negative terminal 57a of the capacitor. This is indicated in Fig. 2 by the arrow 20e. As a result of the application of negative voltage to the control electrode of weld initiating valve 20, valve 20 is prevented from being fired again immediately following the beginning of the heat period, and is thus prevented from initiating a new heat period during the one already in progress, and thus false timing of the heat period is prevented. Consequently, capacitor 12 begins to discharge through adjustable resistor 16 into capacitor 11, and the voltage on the control electrode 3c of leading timing valve 3 begins to decrease in accordance with the discharge curve 12c of capacitor 12, as illustrated in Fig. 2. Each half-cycle of conduction of valve 3 causes a pulse of voltage to be induced in the secondary winding 1a, which fires the leading main ignitron valve (not shown) and also causes a voltage to be induced in the secondary winding 1c, which fires the trailing timing valve 4 on the next positive half-cycle of its anode voltage. The initiation of conduction by valve 4 is indicated by the arrow 4e in Fig. 2. Conduction by the trailing timing valve induces a voltage in the secondary winding 2b of transformer 2 which fires the trailing main ignitron in the same half-cycle of supply line voltage.

Thus, while the capacitor 12 is discharging into capacitor 11 in accordance with curve 12c, valves 3 and 4 conduct in alternate half-cycles of line voltage and cause the main ignitrons to conduct and furnish welding current pulses to the welding electrodes in each half-cycle in which either valve 3 or valve 4 conducts.

It will be noted that conduction by valve 3 provides a conducting path for the actuating solenoid 28 of the solenoid valve which controls the movement of the welding electrodes. This path is traced through rectifiers 31 and 32 and valve 3, and is in parallel with valve 26 through which energization of the solenoid valve was initially established.

Conduction by valve 3 also energizes the control transformer 42 to charge the "off" time capacitor 59, which is connected in circuit with its secondary winding 42b and a diode valve 60, which is poled to charge the capacitor negative at its terminal 59a. As a result, sequence initiating valve 26 is deenergized, since its control electrode cannot be more positive than the negative terminal 59a, to which it is connected through diode valve 61. The termination of conduction of valve 26 is indicated in Fig. 2 by the arrow 26e. Although valve 26 ceases to conduct, the energizing winding 28 of the solenoid valve remains energized through the parallel conducting path through valve 3. Another result of the termination of conduction by valve 26 is the deenergization of transformer 43. Consequently, the turnoff voltage previously induced in its secondary winding 43c disappears, thus permitting the turn-on voltage induced in secondary winding 41b to charge the hold capacitor 55. This charge is represented in Fig. 2 by the horizontal portion of curve 55b. A diode valve 62, which is connected in the charging circuit, is poled to produce positive voltage at terminal 55a, with the result that the valve 27 is rendered conducting, owing to the connection of its control electrode 27C to terminal 55a. Conduction by valve 27 is represented in Fig. 2 by the arrow 27d.

A further result of the termination of conduction in valve 26 and the deenergization of transformer 43, is the termination of charging of the weld interval capacitor 37. Consequently, this capacitor begins to discharge in accordance with the curve 37a of Fig. 2. At a predetermined point in its discharge, the valve 36 becomes nonconducting, owing to the connection of its main control electrode 36c to the positive terminal of the capacitor. If, as a result of termination of conduction of valve 36, the transformer 41 were permitted to become deenergized during a heat period, i. e., a period in which valves 3 and 4 are conducting and causing the main ignitron to supply welding current to the work, the hold time would be initiated during such heat period, and the effective time of this hold period would thus be reduced to less than the time required. However, such deenergization of the transformer 41 by the termination of conduction of valve 36 during a heat period is prevented by a parallel circuit through rectifier 33 and valve 3. Thus, the hold period cannot be initiated while valves 3 and 4 are conducting, which is to say that it cannot be initiated during a heat period.

As the heat timing capacitor 12 continues to discharge into capacitor 11, the heat period approaches termination in accordance with discharge curve 12c. At the instant which is determined by the intersection of curve 12c with the O—O axis, valve 3 becomes nonconducting and valve 4 ceases to conduct in the immediately following half-cycle of line voltage. This instant marks the end of the first heat period and the beginning of the cool period, preparatory to initiating a second heat period. Termination of conduction in valves 3 and 4 is indicated in Fig. 2 by arrows 3f and 4f.

Since another heat period is to follow the cool period, the solenoid valve actuating winding 28 must not be permitted to become deenergized by termination of conduction in valve 3. Such premature deenergization is prevented by the valve 27, which is maintained conducting as a result of the charge on the hold capacitor 55, to the positive terminal of which the control electrode of valve 27 is connected. Thus, an energizing circuit for the solenoid valve is maintained through rectifier 31 and valve 27. It will be noted at this point that when the valve 26 ceased to conduct, rectifiers 31 and 32 in the sectionalized conductor 29 provided an alternative energizing circuit for the solenoid valve through electric valve 3, and that when valve 3 ceased to conduct, rectifier 31 provided an alternative energizing circuit through valve 27. Thus, the control of the solenoid valve is shifted from valve 26 to valve 3, to valve 27 in succession, by the simple means of rectifiers 30, 31 and 32, in the sectionalized conductor, thereby eliminating the necessity for complex switching apparatus which otherwise would be required for such take-over control from one valve to another.

The charging of cool time capacitor 57 ended with termination of conduction in valve 3 and consequently, capacitor 57 discharges through cool time adjustable resistor 63 and fixed resistor 64, in accordance with curve 57b. At the end of a predetermined interval of time which is determined by the adjustment of resistor 63, capacitor 57 discharges sufficiently to allow the voltage of control electrode 20c of the heat initiating valve 20 to regain the critical value and fire as indicated in Fig. 2 by arrow 20f. As a result, the heat timing capacitors 11 and 12 are recharged as indicated by curves 11d and 12d in Fig. 2, and the leading heat timing valve 3 is fired in the next positive half-cycle of its anode voltage, as indicated by arrow 3g. Valve 4 fires in trailing response as indicated by the arrow 4g. This marks the end of the cool period. Thereafter, the sequence previously described is repeated, with valves 3 and 4 and the main ignitrons firing in leading and trailing relationship during the second heat period.

During this second heat period, weld interval timing capacitor 37 continues to discharge in accordance with curve 37a until, at the end of a predetermined interval, the voltage of the control electrode 36c of the weld interval timing valve has decreased below the critical firing value to terminate conduction of the valve 36 as indicated by arrow 36e in Fig. 2. This would terminate the energization of transformer 41 unless a parallel conducting path is provided. If the final heat period of the weld interval is still in progress, the transformer 41 must not be permitted to become deenergized, since this would terminate the charging of the hold capacitor 55, and thereby prematurely initiate the hold period and thus shorten the time the solenoid valve remains energized after the end of the final heat period.

This requirement is fulfilled by the action of rectifier 33 providing a parallel path through valve 3 after valve 36 ceases conducting. Thus, as long as valve 3 remains conducting during the final heat period of the weld interval, transformer 41 remains energized and the hold capacitor 55 is maintained at full value for the remainder of the final heat period.

At a predetermined point in the discharge of capacitor 12, in accordance with curve 12d, valves 3 and 4 cease conducting, as indicated by arrows 3h and 4h to end the final heat period, and transformer 41 becomes deenergized, thereby to initiate discharge of the hold capacitor 55. This point marks the beginning of the hold period. During the discharge of the hold capacitor in accordance with curve 55b, valve 27 continues to conduct and the solenoid valve remains energized to maintain the welding electrodes clamped against the work. Also, transformer 42 is maintained energized, thereby to maintain full negative charge on the "off" capacitor 59, and prevent premature initiation of the "off" time period.

At the end of a predetermined interval of time, after the initiation of its discharge, the hold capacitor 55 discharges to a point at which the voltage supplied to the control electrode 27c of sequencing valve 27 falls below the critical value, and valve 27 ceases to conduct, as indicated in Fig. 2 by arrow 27e. This results in deenergizing the actuating solenoid 28 of the solenoid valve, which permits the welding electrodes to separate to provide for movement of the work preparatory to the next spot weld. It also results in deenergization of transformer 42, thereby to initiate discharge of the "off" time capacitor 59. This marks the end of the hold time and the beginning of the "off" time.

The discharge of the "off" time capacitor proceeds in accordance with curve 59b. During this discharge, the voltage of the control electrode 26c of the sequence initiating valve 26 is maintained more negative than the cutoff valve, and consequently during the discharge, the valve 26 cannot be fired to initiate a new sequence, even though the initiating switch is maintained closed.

However, at the end of a predetermined interval of time, after the initiation of its discharge, "off" capacitor 59 discharges to the point at which the voltage, which is supplied to the control electrode 26c of electric valve 26, may exceed the critical firing value if the initiating switch is maintained closed. This causes the valve 26 to fire, as indicated by arrow 26f, to initiate the squeeze period of a new welding cycle.

Although in accordance with the provisions of the patent statutes, this invention is described as embodied in concrete form, and its principle has been explained, together with the best mode in which it is now contemplated applying that principle, it will be understood that the invention is not limited to the specific apparatus shown and described, since alterations and modifications will readily suggest themselves to persons skilled in the art without departing from the true spirit of the invention or from the scope of the annexed claims.

What I claim as new and desire to secure by Letters Patent of the United States is:

1. A sequencing control system comprising in combination, a pair of voltage supply terminals, a plurality of electric valves, each having an input control circuit and an output circuit having a first terminal connected to one of said supply terminals and a second terminal connected to the other of said supply terminals, a plurality of load devices connected to be supplied from said output circuits, means for energizing said input circuits in a predetermined order, and electrical interconnections including rectifiers between said second terminals poled to provide for energization of preselected groups of said load devices in a preselected order in response to said energization of said input circuits in preselected order.

2. In combination, a pair of voltage supply terminals, a plurality of electric valves each having a load circuit provided with a cathode having a cathode connected to one of said supply terminals and an anode having a terminal connected to the other of said supply terminals, a plurality of load devices connected in said output circuits between said anode terminals and said other supply terminal, means for energizing said input circuits in a predetermined order, and electrical circuit interconnections including half wave rectifiers between said anode terminals and poled to provide for energization of said load devices in response to energization of said input circuits in a different order from said predetermined order of energization of said input circuits.

3. In combination, a pair of voltage supply terminals, a plural number of electric valves each having an input control circuit and an output circuit having one terminal connected to one of said supply terminals and a second terminal connected to the other of said supply terminals, a plurality of load devices greater in number than said number of electric valves, means for energizing said input circuits in a first predetermined sequence, and electrical interconnections between said second terminals including half wave rectifiers poled to effect energization of all of said load devices in preselected groups and in a preselected sequence in response to said energization of said input circuits in said first predetermined sequence.

4. A grouping and sequencing control system comprising in combination, a pair of voltage supply terminals, a sectionalized conductor, a predetermined plural number of electric valves each having an input control circuit and an output circuit having a first terminal connected to one of said supply terminals and a second terminal connected to a different one of the sections of said conductor, a predetermined plurality of load devices greater in number than said predetermined number of electric valves and each connected between the other of said supply terminals and a different one of said sections, means for energizing said input circuits in a first predetermined sequence and a plurality of half wave rectifiers with at least one connected in each of said sections and poled to effect energization of each of certain of said load devices by more than one of said valves and energization of all of said load devices in predetermined groups and in a preselected sequence in response to energization of said input circuits in said first predetermined sequence.

5. A grouping and sequencing control system comprising in combination, a pair of voltage supply terminals, a sectionalized conductor electrically intermediate said voltage supply terminals, a predetermined plural number of electric valves each provided with an input control circuit and an output circuit having a first terminal connected to one of said supply terminals and a second terminal connected to a different one of said sections of said sectionalized conductor, a predetermined plurality of load devices greater in number than said predetermined number of electric valves, each connected between the other of said supply terminals and a different one of said sections of said conductor, means for energizing said input control circuits in a predetermined sequence and a plurality of half wave rectifiers with at least one connected in each of said sections and reversely poled with respect to certain of said output circuits to effect energization of each of certain of said load devices by more than one of said valves and energization of all of said load devices in predetermined groups and in a preselected sequence in response to energization of said input circuits in said first preselected sequence.

6. A grouping and sequencing control system comprising in combination, a pair of voltage supply terminals, a sectionalized conductor, a predetermined number of electric valves each provided with an input control circuit and with an output circuit including a cathode connected to one of said supply terminals and an anode connected to a corresponding section of said sectionalized conductor, a predetermined plurality of load devices greater in number than said predetermined number of electric valves each connected between the other of said supply terminals and a corresponding one of said sections of said sectionalized conductor, a predetermined number of load devices each connected between the other of said supply terminals and a corresponding one of said sections of said conductor, means for energizing said input control circuits in a predetermined sequence, and a plurality of half wave rectifiers connected in said conductor with at least one rectifier in each of said sections and reversely poled with respect to certain of said anodes to effect energization of each of certain of said load devices by more than one of said valves and energization of all of said load devices in predetermined groups and in a preselected sequence in response to energization of said input circuits in said first preselected sequence.

7. In combination, a pair of voltage supply terminals, an electric valve provided with a control electrode, an anode connected to one of said supply terminals and a cathode connected to the other, a third voltage supply terminal providing a voltage that is positive with respect to said cathode, a fourth voltage supply terminal providing a voltage that is negative with respect to said cathode, a capacitor having one terminal connected to said control electrode, a normally open momentary contact switching device connected between the opposite terminal of said capacitor and said third voltage supply terminal, a transformer having its primary winding connected in the anode circuit of said valve and having a secondary winding, and a charging circuit for said capacitor comprising connections from said secondary winding including a rectifier poled to provide a charge on said capacitor which is positive at the capacitor terminal connected to said control electrode thereby to provide a sealing-in circuit for said valve in response to momentary closure of the contacts of said switching device.

References Cited in the file of this patent
UNITED STATES PATENTS

| 2,422,020 | Kingsmill | June 10, 1947 |
| 2,492,749 | Hills | Dec. 27, 1949 |